United States Patent [19]

Shiohara et al.

[11] 4,169,819

[45] Oct. 2, 1979

[54] STABILIZED CHLORINE-CONTAINING RESIN COMPOSITION

[75] Inventors: Tomoo Shiohara, Kyoto; Mikihiko Horioka, Kobe, both of Japan

[73] Assignee: Sekisui Kagaku Kogyo Kabushiki Kaisha, Osaka, Japan

[21] Appl. No.: 897,609

[22] Filed: Apr. 18, 1978

[30] Foreign Application Priority Data

Apr. 18, 1977 [JP] Japan .................. 52-45035

[51] Int. Cl.² .................. C08K 5/12; C08K 5/11; C08K 5/10
[52] U.S. Cl. .................. 260/23 XA; 260/28.5 D; 260/31.8 R; 260/31.8 G; 260/45.85 R; 260/45.85 T; 260/45.85 E; 260/45.85 V; 260/45.95 L
[58] Field of Search ........ 260/31.8 R.31.8 G, 23 XA, 260/45.85 R, 45.85 T, 45.95 L, 31.4 R, 45.85 E, 45.85 V, 28.5 D; 252/407

[56] References Cited

U.S. PATENT DOCUMENTS

| | | | |
|---|---|---|---|
| 2,459,746 | 1/1949 | Radcliffe | 260/31.4 R |
| 2,943,070 | 6/1960 | Hecker et al. | 260/45.95 L |
| 2,975,152 | 3/1961 | Hurwitz et al. | 260/410.6 |
| 3,953,358 | 4/1976 | Sjogreen | 260/23 XA |

*Primary Examiner*—Veronica P. Hoke
*Attorney, Agent, or Firm*—Sughrue, Rothwell, Mion, Zinn and Macpeak

[57] ABSTRACT

A stabilized chlorine-containing resin composition having improved thermal stability comprising a chlorine-containing resin and, as a stabilizer, a melted then solidified mixture having a melting temperature of about 50° to about 180° C. of at least one polyhydric alcohol and at least one ester derivative of a polyhydric alcohol.

14 Claims, No Drawings

STABILIZED CHLORINE-CONTAINING RESIN COMPOSITION

BACKGROUND OF THE INVENTION

1. Field of the Invention

This invention relates to a chlorine-containing resin composition having superior thermal stability, and more specifically to a chlorine-containing resin composition having superior thermal stability and comprising a specific mixture of a polyhydric alcohol and an ester derivative of a polyhydric alcohol as a stabilizer.

2. Description of the Prior Art

Chlorine-containing resins are intrinsically unstable to heat, and, when heated during molding, for example, chlorine-containing resins decompose with hydrogen chloride being evolved and color developing. To prevent coloration by heat decomposition, the previous practice has been to mold these resins after a heat stabilizer has been added to these resins.

Heat stabilizers employed heretofore have the disadvantage that they contain a heavy metal such as lead which is toxic.

Combinations of calcium stearate, zinc stearate, organotin compounds, nitrogen-containing stabilizers such as β-aminocrotonic acid esters, and polyhydroxy compounds such as pentaerythritol or dipentaerythritol have been used as stabilizers having reduced toxicity. However, when these polyhydroxy compounds are used, coloration occurs at an early stage. Moreover, the impact strength of molded products containing a polyhydroxy compound such as pentaerythritol or dipentaerythritol as a stabilizer component is, unfortunately, decreased. Pentaerythritol or dipentaerythritol is difficult to pulverize into a fine powder. Furthermore, since these compounds have a high melting point (pentaerythritol has a melting point of 210° to 235° C., and dipentaerythritol has a melting point of 215° to 225° C.), they do not melt as the molding temperature for a chlorine-containing resin, but rather remain as coarse particles in the molded product. For this reason, the impact strength of the molded product is reduced.

Further, Japanese Patent Publication No. 38767/1973 (i.e., Japanese Published Examined Patent Application No. 38767/1973) describes an ester compound of pentaerythritol with maleic acid as a thermal stabilizer for a chlorine-containing resin. But pentaerythritol maleate does not provide sufficient thermal stability and sufficient impact strength of the chlorine-containing resin is not maintained.

Japanese Patent Publication No. 25257/1976 (i.e., Japanese Published Examined Patent Application No. 25257/1976) describes, as a stabilizer for a chlorine-containing resin, a eutectic mixture of dipentaerythritol and/or bisphenol A with pentaerythritol and having a melting point of less than the molding temperature of the chlorine-containing resin. But the eutectic mixture of dipentaerythritol and pentaerythritol has a melting temperature of more than 180° C. and, the eutectic mixture of dipentaerythritol, bisphenol A and pentaerythritol also has a melting temperature of more than 180° C. Therefore, the eutectic mixtures remain as coarse particles in the molded chlorine-containing resin after molding. Thus, the eutectic mixture does not provide sufficient thermal stability and sufficient impact strength of the chlorine-containing resin is not maintained.

SUMMARY OF THE INVENTION

An object of this invention is to provide a chlorine-containing resin composition having superior thermal stability and impact strength, which is free from the defects associated with the use of the above-described polyhydroxyl compounds as a stabilizer.

According to this invention, there is provided a chlorine-containing resin composition comprising a chlorine-containing resin and, as a stabilizer, a melted then solidified mixture having a melting temperature of about 50° to about 180° C. of at least one polyhydric alcohol and at least one ester derivative of a polyhydric alcohol.

DETAILED DESCRIPTION OF THE INVENTION

The term "chlorine-containing resin" as used in the description of this invention denotes a resin which contains chlorine in the molecule thereof. Examples of chlorine-containing resins are polyvinyl chloride, polyvinylidene chloride, a vinyl chloride-vinylidene chloride copolymer, a copolymer of vinyl chloride or vinylidene chloride as a main monomer unit with ethylene, vinyl acetate, an acrylic acid ester or acrylonitrile, chlorinated polyvinyl chloride, and chlorinated polyethylene. More specifically, examples of suitable chlorine-containing resins which can be used in this invention include, for example, polyvinyl chloride, polyvinylidene chloride, a vinyl chloride-vinylidene chloride copolymer having a vinyl chloride content of about 5 to about 95% by weight; a vinyl chloride-vinyl acetate copolymer, most generally commercially available with a vinyl acetate content of about 0.4 to about 40 wt.%, more often 0.5 to 20 wt.%; a vinyl chloride-ethylene copolymer, most generally commercially available with an ethylene content of about 1 to about 15 mole% and an average degree of polymerization of about 700 to about 1500; chlorinated polyvinyl chloride, most generally commercially available with a chlorine content of about 60 to about 70 wt.%, more often 63 to 68 wt.%; and chlorinated polyethylene, most generally commercially available with a chlorine content of about 25 to about 45 wt.%.

Suitable polyhydric alcohols which can be used in this invention include alcohols which have two or more hydroxyl groups and 15 or less carbon atoms in the molecule. Examples of specific polyhydric alcohols which can be used in this invention include pentaerythritol, dipentaerythritol, tripentaerythritol, mannitol, sorbitol, ethylene glycol, propylene glycol, trimethylene glycol, trimethylolpropane, and 3-methyl-1,3,5-pentantriol. Preferred examples of polyhydric alcohols which can be used in this invention include pentaerythritol, dipentaerythritol, mannitol and sorbitol. Most preferred examples of polyhydric alcohols which can be used in this invention include pentaerythritol and dipentraerythritol.

Suitable ester derivations of polyhydric alcohols which can be used in this invention are esterification reaction products between the hydroxyl groups of a polyhydric alcohol and one or more organic carboxylic acids. The polyhydric alcohols which can be used in this invention to form suitable ester derivatives have two or more hydroxyl groups and 15 or less carbon atoms. Examples of polyhydric alcohols which can form suitable ester derivatives include pentaerythritol, dipentaerythritol, tripentaetrythritol, mannitol, sorbitol, ethylene glycol, propylene glycol, trimethylene glycol, trimethylolpropane and 3-methyl-1,3,5-pentantriol and, preferably, pentaerythritol and dipentaerythritol. The number of esterified hydroxyl groups in the polyhydric alcohol is not particularly restricted, but partial esters in which at least one hydroxy group of the polyhydric alcohol remains unesterified are preferred.

Suitable organic carboxylic acids which can form suitable ester derivatives may be any organic carboxylic acid which can react with the hydroxyl groups of a polyhydric alcohol to form an ester derivative. As the number of carbon atoms of the organic carboxylic acid increases, the stabilizing effect of the resulting mixture decreases. Hence, organic acids having 10 or less carbon atoms are preferred. Examples of suitable organic carboxylic acids include saturated monocarboxylic acids such as acetic acid, propionic acid, butyric acid, valeric acid, caproic acid, enanthylic acid, caprylic acid, pelargonic acid and capric acid, unsaturated monocarboxylic acids such as acrylic acid, crotonic acid, angelic acid and allylacetic acid, saturated dicarboxylic acids such as oxalic acid, malonic acid, succinic acid, glutaric acid, adipic acid, pimelic acid and azelaic acid, and unsaturated dicarboxylic acids such as maleic acid, fumaric acid and itaconic acid.

The ester derivative of the polyhydric alcohol as used in this invention can be prepared by reacting the polyhydric alcohol with the organic carboxylic acid using known methods.

The stabilizing mixture used in this invention is prepared by melting and mixing at least one polyhydric alcohol and at least one ester derivative of a polyhydric alcohol. The polyhydric alcohol may be same or different from the polyhydric alcohol present in the ester derivative. For example, this mixture can be easily synthesized by mixing and melting the polyhydric alcohol and the ester derivative. A single ester derivative may be used or a mixture of two or more ester derivatives may be used. Further, a single polyhydric alcohol may be used or a mixture of two or more polyhydric alcohols can be used. When a polyhydric alcohol is esterified with an organic carboxylic acid, a mixture of the polyhydric alcohol and various esters (monoester, diester, etc.) of the polyhydric alcohol is obtained. This mixture, either as such or after, as required, adding a polyhydric alcohol or an ester derivative of a polyhydric alcohol, is melted to form the desired stabilizing mixture. Partial ester derivatives, complete ester derivatives and mixed ester derivatives may be used. Preferably, prior to use, the solidified mixture obtained is pulverized to a fine powder. The particle size is not critical, but usually a particle size of about 0.1 to about 80μ, preferably 0.2 to 50μ, is suitable.

The stabilizing mixture used in this invention should have a melting temperature of about 50° to about 180° C. The melting temperature denotes the temperature at which a part of the mixture begins to melt and flow, when the melting temperature is measured by heating a sample of the mixture at a rate of 3° C./min. in a mircomelting point measuring device.

When the melting temperature exceeds about 180° C., the stabilizing mixture does not dissolve and disperse sufficiently during molding, but remains as coarse particles in the resulting molded product, and therefore, the properties of the molded product such as impact strength are deteriorated. If the melting temperature is lower than about 50° C., the softening temperature of the molded product decreases and the effect of heat stabilization is reduced. Preferably, the melting temperature of the stabilizing mixture of 70° to 120° C.

The stabilizing mixture of at least one polyhydric alcohol and at least one ester derivative of a polyhydric alcohol which can be used in the present invention must have a melting temperature of about 50° to about 180° C. Other conditions of the stabilizing mixture (such as, weight ratio of the polyhydric alcohol and the ester derivative of a polyhydric alcohol) are not critical. However, a stabilizing mixture containing 99 to 30 wt.% of the polyhydric alcohol and 1 to 70 wt.% of the ester derivative of a polyhydric alcohol is preferred since the thermal stability of the chlorine-containing resin composition is improved.

The stabilized chlorine-containing resin composition is prepared by adding the above-described mixture having a melting temperature of about 50° to about 180° C. and comprising at least one polyhydric alcohol and at least one ester derivative of a polyhydric alcohol to a chlorine-containing resin. Although the melting temperature of the stabilizing mixture of this invention is greatly changed depending on the amount of the ester derivative of a polyhydric alcohol present, the amount of each of the polyhydric alcohol component and the ester derivative of a polyhydric alcohol component used in the stabilizing mixture is not critical and only the melting temperature being in the above described range is essential. The amount of the stabilizing mixture present in the chlorine-containing resin composition is not critical, but preferably, an amount of about 0.05 to about 10.0 parts by weight, more preferably 0.1 to 0.5 part by weight, per 100 parts by weight of the chlorine-containing resin is used. When the amount of the stabilizing mixture is less than the lower limit (i.e., 0.05 part by weight per 100 parts by weight of the chlorine-containing resin), sufficient thermal stability of the chlorine-containing resin is not obtained. When the amount of the stabilizing mixture is more than the upper limit (i.e., 10.0 parts by weight per 100 parts by weight of the chlorine-containing resin), the impact strength and moldability of the chlorine-containing resin decrease.

The chlorine-containing resin composition of this invention may further contain conventional stabilizers, for example, metal soaps such as calcium stearate or zinc stearate, organotin compounds, metal oxides such as magnesium oxide, calcium oxide or zinc oxide, metal hydroxides such as calcium hydroxide, magnesium hydroxide or barium hydroxide, silicate salts such as dicalcium silicate, aluminate salts such as calcium aluminate or dicalcium aluminate, and titanic acid salts such as calcium titanate. A suitable amount of these conventional stabilizers ranges from about 0.3 to about 10 parts by weight per 100 parts by weight of the chlorine-containing resin.

To improve moldability, etc., the chlorine-containing resin composition may further contain fillers, pigments, lubricants, etc., which are conventionally added to chlorine-containing resins.

Since the stabilizing mixture of this invention is melted and dispersed uniformly in the chlorine-containing resin during molding, molded products having superior impact strength and heat stability can be obtained.

The following examples are given to illustrate the present invention in more detail. All parts, percents, ratios and the like in the examples are by weight, unless otherwise indicated.

EXAMPLE 1

In each of Runs 1 to 4 shown in Table 1 below, a mixture having a melting point of 70° to 92° C. and composed of dipentaerythritol, dipentaerythritol monoacetate, dipentaerythritol diacetate and dipentaerythritol triacetate was produced by melting the materials together.

Then, 2 parts of each of the resulting mixtures and 0.5 part of a hydrocarbon wax were added to 100 parts of a vinyl chloride resin (degree of polymerization: 1,050), and the materials were well mixed. Each of the mixtures was fed to a roll mill held at 200° C., and the color of the resin was observed after a lapse of 3, 5 and 7 minutes. The degrees of coloration at an early stage of such were compared. The results obtained are shown in Table 1.

After kneading each of the mixtures for 5 minutes under the above described conditions, each mixture was press-formed for 5 minutes with a press at 190° C. to form sheets of each having a thickness of 3 mm. The Vicat softening temperature of the sheets was measured, and the results obtained are shown in Table 1.

When compared with vinyl chloride compositions containing stabilizing mixtures having a melting point of more than 180° C. or less than 50° C. in Comparative Example 1 given below, the compositions obtained in this Example have less coloration at an early stage. No decrease in the Vicat softening points of the compositions in this Example was observed at all.

COMPARATIVE EXAMPLE 1

Vinyl chloride resin compositions were prepared in the same manner as described in Example 1 by using stabilizing mixtures having a melting temperature of more than 180° C. or less than 50° C. and prepared by melting and mixing dipentaerythritol, an ester of dipentaerythritol with acetic acid or stearic acid and/or pentaerythritol in the proportions shown in Table 1 below. The coloration at an early stage and the Vicat softening temperature of each of the compositions were measured, and the results obtained are shown in Table 1 below.

EXAMPLE 2

To 100 parts of a vinyl chloride resin (degree of polymerization: 1,050) were added 1 part of each of the stabilizing mixtures prepared in Example 1 and indicated in Table 2 below, and calcium stearate, zinc stearate, calcium hydroxide and dicalcium silicate in the proportions indicated in Table 1 above. Each of the compounds obtained was fed into an oil bath at 200° C. in accordance with JIS K6723. The time which elapsed until a Congo Red test paper turned blue was measured to determine the thermal stability of each of the compounds.

The results obtained are shown in Table 2 below. The time which represented thermal stability was as long as 33 to 59 minutes, and no black spots nor blackening occurred.

Then, each of the above compounds was further mixed with 0.5 part of a hydrocarbon wax, and the resulting mixture was fed into a kneading roll mill at 200° C. to knead the mixture. The time which elapsed until the mixture turned black (brown) was measured. The results obtained are shown in Table 2 below.

After kneading the mixture for 5 minutes in the manner described above, the mixture was press-formed for 5 minutes with a press kept at 190° C. to form a sheet having a thickness of 3 mm. The resulting sheet was subjected to Charpy impact testing in accordance with JIS K-6745. The results obtained are shown in Table 2 below.

When compared with compositions obtained in Comparative Example 2 given below, the compositions obtained in this Example have good thermal stability are stable for a long time before, blackening (browning) and have a very high Charpy impact value. It was thus found that thermal stability increased without a reduction in impact strength.

COMPARATIVE EXAMPLE 2

The stabilizing mixtures produced in Comparative Example 1 were used as shown in Table 2 below. The thermal stability, blackening (browning) time, and Table 1

| | Example 1 (Run No.) | | | | Comparative Example 1 (Run No.) | | | | | |
|---|---|---|---|---|---|---|---|---|---|---|
| | 1 | 2 | 3 | 4 | 5 | 6 | 7 | 8 | 9 | 10 |
| Composition (% by weight) | | | | | | | | | | |
| Dipentaerythritol | 62 | 50 | 42 | 31 | 80 | 50 | 100 | 70 | 50 | — |
| Dipentaerythritol Monoacetate | 19 | 24 | 34 | 37 | 19 | — | — | — | — | — |
| Dipentaerythritol Diacetate | 15 | 19 | 20 | 24 | 1 | — | — | — | — | — |
| Dipentaerythritol Triacetate | 4 | 7 | 4 | 8 | 0 | — | — | — | — | — |
| Dipentaerythritol Monostearate | — | — | — | — | — | 44 | — | — | — | — |
| Dipentaerythritol Distearate | — | — | — | — | — | 5 | — | — | — | — |
| Dipentaerythritol Tristearate | — | — | — | — | — | 1 | — | — | — | — |
| Pentaerythritol | — | — | — | — | — | — | — | 30 | 50 | 100 |
| Melting Temperature (°C.) | 85–92 | 79–82 | 74–80 | 71–75 | 185–195 | 30 | 215–225 | 181–190 | 187–195 | 210–235 |
| Coloration at Early Stage | | | | | | | | | | |
| 3 Minutes | Pale yellow | Pale yellow | Pale yellow | Pale yellow | Yellow | Yellow | Yellow | Yellow | Yellow | Yellow |
| 5 Minutes | Yellow | Yellow | Yellow | Yellow | Orange yellow | Orange | Yellow | Orange yellow | Orange yellow | Orange yellow |
| 7 Minutes | Yellow | Yellow | Yellow | Yellow | Orange | Reddish Orange | Orange | Orange | Orange | Orange |
| Vicat Softening Temperature (°C.) | 82–83 | 82–83 | 82–83 | 81–82 | 82–83 | 63–64 | 82–83 | 74–77 | 79–81 | 82–83 |

Charpy impact value of the resulting compounds were evaluated in the same manner as described in Example 2.

As shown in Table 2, the compositions obtained had very poor thermal stability, and most of them developed black spots or blackened before the Congo Red test papaer turned blue.

The composition of the stabilizing mixture used in Rung No. 8 was similar to that of the stabilizing mixture in Example 2 and the resin composition had superior thermal stability. However, the resin composition had a melting point of as high as 180° to 195° C., and the Charpy impact value of the resin composition was as low as 8 kg/cm².

composition containing a stabilizing mixture having a low melting temperature (Run No. 11) and the Vicat softening temperature of the composition containing a stabilizing mixture composed mainly of pentaerythritol and having a relatively low melting temperature (Run No. 12) decreased somewhat, but superior results in coloration at an early stage, thermal stability and Charpy impact value were obtained with these compositions.

COMPARATIVE EXAMPLE 3

Stabilizing mixtures having a melting temperature of 46° to 161° C. were prepared by melting and mixing pentaerythritol, dipentaerythritol and other alcohols Table 2

| | Example 2 (Run No.) | | | | | | | Comparative Example 2 (Run No.) | | | | | |
|---|---|---|---|---|---|---|---|---|---|---|---|---|---|
| | 1 | 2 | 3 | 4 | 5 | 6 | 7 | 8 | 9 | 10 | 11 | 12 | 13 |
| Composition (parts by weight) | | | | | | | | | | | | | |
| Polyvinyl Chloride | 100 | 100 | 100 | 100 | 100 | 100 | 100 | 100 | 100 | 100 | 100 | 100 | 100 |
| Calcium Stearate | — | 0.5 | 0.5 | — | 0.5 | 0.5 | — | 0.5 | 0.5 | 0.5 | 0.5 | 0.5 | 0.5 |
| Zinc Stearate | 1 | 1 | 1 | 1 | 1 | 1 | 1 | 1 | 1 | 1 | 1 | 1 | — |
| Calcium Hydroxide | 1 | — | — | — | — | — | 1 | — | — | — | — | — | — |
| $2CaO \cdot SiO_2$ | — | 1 | — | 1 | — | — | — | 1 | 1 | 1 | 1 | 1 | 1 |
| $3CaO \cdot Al_2O_3$ | — | — | 1 | — | — | — | — | — | — | — | — | — | — |
| $CaO \cdot TiO_2$ | — | — | — | — | 1 | — | — | — | — | — | — | — | — |
| Dioctyltin Mercaptide | — | — | — | — | — | 0.5 | 0.5 | — | — | — | — | — | — |
| Stabilizing Mixture* | ① | ② | ③ | ④ | ② | ② | ② | ⑤ | ⑥ | ⑦ | ⑧ | ⑨ | ⑩ |
| Thermal Stability (min.) | 47 | 53 | 50 | 40 | 43 | 33 | 59 | 38 Blackened | 8 Blackened | 11 Black spots | 17 Black spots | 13 Black spots | 16 Black spots |
| Blackening (browning) Time (min.) | 71 | 59 | 66 | 54 | 62 | 58 | 69 | 35 | — | 18 | 26 | 27 | 29 |
| Charpy Impact Value (kg/cm²) | 15 | 14 | 14 | 13 | 15 | 12 | 11 | 8 | 12 | 7 | 8 | 8 | 5 |

*1 part by weight of each of the stabilizing mixtures shown in Table 1 was used.
The circled numbers correspond to the Run Numbers in Table 1.

EXAMPLE 3

Stabilizing mixtures having a melting temperature of 54° to 173° C. were prepared by melting and mixing pentaerythritol, pentaerythritol acetates, dipentaerythritol, dipentaerythritol acetates, and dipentaerythritol monooctylate in the combinations indicated in Run Nos. 11 to 15 in Table 3 below.

Using each of the mixtures, chlorine-containing resin compositions were prepared. The coloration at an early stage and the Vicat softening temperature of each of the resin compositions were measured, and the results obtained are shown in Table 4 below.

Then, the thermal stability and Charpy impact value of compounds having the compositions shown in Table 4 below were tested in the same manner as described in Example 2, and the results obtained are shown in Table 4 below.

When compared with the Vicat softening temperature of the compositions shown in Comparative Examples 1 and 2, the Vicat softening temperature of the and esters of other alcohols in the combinations indicated in Table 3 below (Run Nos. 16 to 20).

The coloration at an early stage and the Vicat softening temperature of each of the compositions containing the resulting stabilizing mixtures were measured in the same manner as described in Example 1.

The results obtained are shown in Table 3 below.

Then, the thermal stability and Charpy impact value of compounds having the compositions indicated in Table 4 below were tested in the same manner as described in Example 2. The results obtained are shown in Table 4 below.

The results shown in Tables 3 and 4 below demonstrate that the coloration at an early stage, thermal stability and impact strength of chlorine-containing resin compositions are not improved by using stabilizing mixtures having a melting temperature of 50° to 180° C. and consisting of polyhydric alcohols and other alcohols or esters other than ester derivatives of polyhydric alcohols.

Table 3

| | Example 3 (Run No.) | | | | |
|---|---|---|---|---|---|
| | 11 | 12 | 13 | 14 | 15 |
| Composition (% by weight) | | | | | |
| Pentaerythritol | 22 | 81 | 20 | 26 | 13 |
| Pentaerythritol Monoacetate | — | — | 4 | 1 | 1 |
| Pentaerythritol Diacetate | 3 | — | — | 2 | — |
| Pentaerythritol Triacetate | 1 | — | 2 | — | — |
| Dipentaerythritol | 74 | — | 70 | 70 | 85 |
| Dipentaerythritol Monoacetate | — | 7 | — | — | — |

Table 3-continued

|  | | | | | |
|---|---|---|---|---|---|
| Dipentaerythritol Diacetate | — | 5 | — | 1 | — |
| Dipentaerythritol Triacetate | — | 2 | — | — | 1 |
| Dipentaerythritol Monooctylate | — | 5 | 4 | — | — |
| Dioctyl Phthalate | — | — | — | — | — |
| Epoxidized Soybean Oil | — | — | — | — | — |
| Glycerol | — | — | — | — | — |
| Octyl Alcohol | — | — | — | — | — |
| Melting Temperature (°C.) | 54–60 | 87–89 | 108–120 | 125–128 | 167–173 |
| Coloration at Early Stage | | | | | |
| 3 Minutes | Pale yellow | Yellow | Pale yellow | Pale yellow | Yellow |
| 5 Minutes | Pale yellow | Yellow | Yellow | Pale yellow | Yellow |
| 7 Minutes | Yellow | Yellow | Yellow | Yellow | Yellow |
| Vicat Softening Temperature (°C.) | 63–65 | 71–73 | 80–82 | 82–83 | 82–83 |

|  | Comparative Example 3 (Run No.) | | | | |
|---|---|---|---|---|---|
|  | 16 | 17 | 18 | 19 | 20 |
| Composition (% by weight) | | | | | |
| Pentaerythritol | — | 90 | — | — | 98 |
| Pentaerythritol Monoacetate | — | — | — | — | — |
| Pentaerythritol Diacetate | — | — | — | — | — |
| Pentaerythritol Triacetate | — | — | — | — | — |
| Dipentaerythritol | 80 | — | 95 | 98 | — |
| Dipentaerythritol Monoacetate | — | — | 3 | — | — |
| Dipentaerythritol Diacetate | — | — | — | — | — |
| Dipentaerythritol Triacetate | — | — | — | — | — |
| Dipentaerythritol Monooctylate | — | — | — | — | — |
| Dioctyl Phthalate | 20 | — | — | — | — |
| Epoxidized Soybean Oil | — | 10 | 2 | — | — |
| Glycerol | — | — | — | 2 | — |
| Octyl Alcohol | — | — | — | — | 2 |
| Melting Temperature (°C.) | 46–48 | 110–120 | 166–172 | 129–131 | 155–161 |
| Coloration at Early Stage | | | | | |
| 3 Minutes | Orange | Orange yellow | Yellow | Yellow | Yellow |
| 5 Minutes | Reddish orange | Orange | Orange | Orange | Yellowish orange |
| 7 Minutes | Brown | Orange | Reddish orange | Orange | Orange |
| Vicat Softening Temperature (°C.) | 50–52 | 76–78 | 80–81 | 81–83 | 79–82 |

*In Run No. 18, the melting temperature becomes 190 to 198° C. if epoxidized soybean oil is not added.

Table 4

|  | Example 3 (Run. No.) | | | | | Comparative Example 3 (Run No.) | | | | |
|---|---|---|---|---|---|---|---|---|---|---|
|  | 14 | 15 | 16 | 17 | 18 | 19 | 20 | 21 | 22 | 23 |
| Composition (parts by weight) | | | | | | | | | | |
| Polyvinyl Chloride | 100 | 100 | 100 | 100 | 100 | 100 | 100 | 100 | 100 | 100 |
| Calcium Stearate | 0.5 | 0.5 | 0.5 | 0.5 | 0.5 | 0.5 | 0.5 | 0.5 | 0.5 | 0.5 |
| Zinc Stearate | 1 | 1 | 1 | 1 | 1 | 1 | 1 | 1 | 1 | 1 |
| $2CaO \cdot SiO_2$ | 1 | 1 | 1 | 1 | 1 | 1 | 1 | 1 | 1 | 1 |
| Stabilizing Mixture* | ⑪ | ⑫ | ⑬ | ⑭ | ⑮ | ⑯ | ⑰ | ⑱ | ⑲ | ⑳ |
| Thermal Stability (min.) | 46 | 57 | 49 | 51 | 38 | 11 Blackened | 19 Blackened | 26 Blackened | 28 Black spots | 13 Blackened |
| Charpy Impact Value (kg/cm²) | 12 | 12 | 16 | 14 | 13 | 6 | 8 | 10 | 8 | 10 |

*1 part by weight of each of the stabilizing mixtures shown in Table 3 was employed.
The circled numbers correspond to the Run Numbers in Table 3.

While the invention has been described in detail and with reference to specific embodiments thereof, it will be apparent to one skilled in the art that various changes and modifications can be made therein without departing from the spirit and scope thereof.

What is claimed is:

1. A stabilized chlorine-containing resin composition consisting essentially of a chlorine-containing resin selected from the group consisting of polyvinyl chloride, polyvinylidene chloride, a vinyl chloride-vinylidene chloride copolymer, a copolymer of vinyl chloride or vinylidene chloride as a main monomer unit with ethylene, vinyl acetate, an acrylic acid ester or acrylonitrile, chlorinated polyvinyl chloride, and chlorinated polyethylene and, as a stabilizer, a melted then solidified mixture having a melting temperature of about 50° to about 180° C. of at least one polyhydric alcohol which has two or more hydroxyl groups and 15 or less carbon atoms in its molecule and at least one ester derivative of a polyhydric alcohol which is the esterification reaction product between the hydroxyl groups of a polyhydric alcohol which has two or more hydroxyl groups and 15 or less carbon atoms in its molecule and one or more organic carboxylic acids which can react with the hydroxyl groups of said polyhydric alcohol to form said ester derivative.

2. The composition of claim 1, wherein the polyhydric alcohol is at least one member selected from the group consisting of pentaerythritol, dipentaerythritol, mannitol and sorbitol.

3. The composition of claim 1, wherein the ester derivative is a partial ester.

4. The composition of claim 1, wherein the ester derivative is an ester derivative of pentaerythritol or dipentaerythritol.

5. The composition of claim 1, wherein the ester derivative contains a residue of an organic carboxylic acid having 10 or less carbon atoms.

6. The composition of claim 5, wherein the organic carboxylic acid residue is an acetic acid residue.

7. The composition of claim 1, wherein the mixture has a melting temperature of 70° to 120° C.

8. The composition of claim 1, wherein the mixture is present in an amount of about 0.05 to about 10.0 parts by weight per 100 parts by weight of the chlorine-containing resin.

9. The composition of claim 8, wherein the mixture is present in an amount of 0.1 to 5.0 parts by weight per 100 parts by weight of the chlorine-containing resin.

10. The composition of claim 1, wherein said polyhydric alcohol is dipentaerythritol and said esterification reaction product is between dipentaerythritol and acetic acid.

11. The composition of claim 1, wherein said polyhydric alcohol is dipentaerythritol, and said esterification reaction product is a mixture of dipentaerythritol monoacetate, dipentaerythritol diacetate and dipentaerythritol triacetate.

12. The composition of claim 1, wherein said polyhydric alcohol is selected from the group consisting of pentaerythritol, dipentaerythritol, tripentaerythritol, mannitol, sorbitol, ethylene glycol, propylene glycol, trimethylene glycol, trimethylolpropane, and 3-methyl-1,3,5-pentantriol.

13. The composition of claim 5, wherein said esterification reaction product is between a polyhydric alcohol selected from the group consisting of pentaerythritol, dipentaerythritol, tripentaetrythritol, mannitol, sorbitol, ethylene glycol, propylene glycol, trimethylene glycol, trimethylolpropane and 3-methyl-1,3,5-pentantriol and one or more carboxylic acids selected from the group consisting of acetic acid, propionic acid, butyric acid, valeric acid, caproic acid, enanthylic acid, caprylic acid, pelargonic acid, capric acid, acrylic acid, crotonic acid, angelic acid, oxalic acid, malonic acid, succinic acid, glutaric acid, adipic acid, pimelic acid, azelaic acid, maleic acid, fumaric acid and itaconic acid.

14. The composition of claim 1, further containing a hydrocarbon wax, calcium stearate and zinc stearate.

* * * * *